United States Patent [19]
Bernstein et al.

[11] Patent Number: 5,729,370
[45] Date of Patent: Mar. 17, 1998

[54] METHOD FOR UPGRADING A COMMUNICATIONS NETWORK

[75] Inventors: Lawrence Bernstein, Short Hills; Brent E. Coy, Morristown, both of N.J.

[73] Assignee: Lucent Technologies Inc., Murray Hill, N.J.

[21] Appl. No.: 605,429

[22] Filed: Feb. 22, 1996

[51] Int. Cl.$^6$ .................................................... H04B 10/20
[52] U.S. Cl. ................................................ 359/118; 359/167
[58] Field of Search ................................. 359/119, 125, 359/137, 145, 146, 118, 167

[56] References Cited

U.S. PATENT DOCUMENTS

| | | | |
|---|---|---|---|
| 4,901,306 | 2/1990 | Gardner | 455/600 |
| 5,327,516 | 7/1994 | Chraplyvy et al. | 385/123 |
| 5,479,595 | 12/1995 | Israelsson | 359/145 |
| 5,600,633 | 2/1997 | Jaisingh et al. | 370/277 |

OTHER PUBLICATIONS

Harman, et al., "Local Distribution for IMTV", IEEE MultiMedia, Fall 1995, pp. 14–23.

Bohn, et al., "The Fiber SLC Carrier System", AT&T Bell Laboratories Technical Journal vol. 63 No. 10, Dec. 1984, pp. 2389–2416.

R. L. Carroll, "Optical Architecture and Interface Lightguide Unit For Fiber-to-the-Home Feature of the AT&T SLC® Series 5 Carrier System", Journal of Lightwave Technology, vol. 7, No. 11, Nov. 1989, pp. 1727–1732.

Bohn, et al., "Fiber in the Loop", AT&T Technical Journal, vol. 71, No. 1, Jan./Feb. 1992, pp. 31–45.

Proceedings of the 10th Annual National Fiber Optic Engineers Conference, vol. 2, Jun. 12–16, 1994, pp. 389–340.

Chen, et al., "Design of Digital Carrierless AM/PM Transceivers", AT&T/Bellcore contribution T1E1.4/92–149, Aug. 19, 1992.

Bohn, et al., "The Fiber–SLC™ carrier system: Bringing lightwave technology to the loop," Bell Laboratories Record, Apr. 1983, pp. 7–10.

"60D Power/Video Cabinet," AT&T Network Systems product brochure, Aug. 1995.

*Primary Examiner*—Leslie Pascal
*Attorney, Agent, or Firm*—Michael A. Morra

[57] ABSTRACT

The present invention is an efficient method for upgrading telephone networks having a large number of copper wire pairs 31 that extend from a telephone central office 300 to a predetermined number of telephone customers 250. Such networks are referred to as narrowband communication networks. However, for telephone companies to be competitive with cable television providers who may soon be offering telephone service, they must upgrade their narrowband networks to handle video communication signals such as CATV. This is done in an efficient multi-step process keeping in mind the eventual network configuration. During the first step, optical cable 21 is installed between the telephone office and a remote terminal 310; and digital loop carrier (DLC) equipment 201,202 is connected at each end. The DLC equipment is suitable for audio but not video communication signals. Thereafter, the DLC equipment is replaced at the telephone central office and at the remote terminal with broadband access (BA) equipment 203,204. The BA equipment is adapted to handle video communication signals. Finally, a broadband link 330 such as coaxial cable 34, or high speed modems 261 connected to copper wire-pairs 31, or wireless transmission is installed between the remote terminal and the telephone customers.

8 Claims, 6 Drawing Sheets

FIG 1
(PRIOR ART)

FIBER SLC SYSTEM

FIBER TO THE HOME (FTTH)

FIBER TO THE CURB (FTTC)

(PRIOR ART)
FIG 2

LEGEND  (21) OPTICAL FIBER  
(31) COPPER WIRE

METHOD FOR UPGRADING A COMMUNICATIONS NETWORK

TECHNICAL FIELD

This invention relates to communications networks, and more particularly to a method for efficiently upgrading a telephone network from one primarily comprising low-bandwidth voice services to one primarily comprising high-bandwidth multimedia services.

BACKGROUND OF THE INVENTION

The growth in optical communications is primarily attributable to the enormous bandwidth (information-carrying capacity) associated with an optical fiber. Today, many homes are connected to a telephone-service provider via copper wires for plain old telephone service (POTS), and to a video-service provider via coaxial cable for cable television (CATV). Whereas the combined bandwidth of these wires and cables is large, the bandwidth of a hair-thin optical fiber is at least an order of magnitude larger—particularly when wavelength division multiplexing (WDM) is employed. Most observers believe that all homes and businesses will be equipped with optical fiber in the future, not because there is a present need for its capabilities, but because excess capacity is desirable in itself. The mere existence of such excess capacity will stimulate services and capabilities that seem unimportant today, but will be indispensable tomorrow. For service providers such as telephone companies, coping with increased competition requires the provision of timely, reliable, flexible, and evolvable information services. Of equal importance is the ability to grow the network in a cost-effective manner; otherwise, competition will drive inefficient providers from the market. Present telecommunication networks comprise a large number of narrowband (copper wire) interconnections between a telephone switching office node (also referred to as a central office) to a large number of individual customers (customers). Such interconnections deliver POTS to customers, but are incapable of delivering video services which are available from CATV providers who will soon be offering POTS.

It is widely believed that all land-line communication will be carried by optical fibers in the future. Indeed, patented technology already exists for transmitting a large number of individual channels over a single fiber using WDM—each channel operating at a different wavelength and transmitting at a rate of at least 5 Gb/s over a span of at least 360 km without signal regenerators (see e.g., U.S. Pat. No. 5,327,516). Various techniques exist for separating the individual wavelengths from each other so that only one wavelength is routed to each customer over a different optical fiber (see e.g., U.S. Pat. No. 4,901,306). This prevailing vision assumes that individual customers will ultimately want such capacity.

Nevertheless, it is not economical at the present time to bring fiber directly into the home because the cost is high and the bandwidth available on coaxial cable, for example, is sufficient to simultaneously deliver more than 100 television channels to each home. (Oddly, even though none may be worth watching in the first place, the ability to choose from among 200 television channels is perceived to be more valuable than the ability to choose from among 100 of them—a triumph of hope over experience.)

Systems have been proposed which extend optical fiber from a central office to an equipment enclosure where optical signals are converted to electrical signals. This is traditionally known as the feeder portion of loop plant. Apparatus within the equipment enclosure converts the optical signals into electrical signals which are routed to individual customers over a broadband link. This is traditionally referred to as the distribution portion of loop plant. However, as the fiber network extends closer to the home, the cost of optical/electrical conversion equipment increases on a per customer basis, and the customer must ultimately pay this increased cost.

What is needed is a method for economically upgrading a narrowband communication network to a broadband communication network that is capable of delivering POTS and CATV service.

SUMMARY OF THE INVENTION

The present invention is a novel method for upgrading telephone networks from narrowband (e.g., voice communication) service capability to broadband (e.g., CATV) service capability. Typical narrowband networks comprise a number of copper wire pairs that extend from a telephone office to a predetermined number of telephone customers. The broadband network of the present invention comprises optical fiber between the telephone office and a remote equipment enclosure and a broadband link, other than fiber, between the equipment enclosure and the customers. Initially, narrowband multiplexing equipment (i.e., equipment that is not capable of handling broadband services) is installed at each end of the optical fiber. At a later time, the narrowband multiplexing equipment is replaced with broadband multiplexing equipment which is capable of handling narrowband services and broadband services. Finally, the broadband link is installed between the equipment enclosure and the telephone customers.

In one illustrative embodiment of the invention, coaxial cable is used as the broadband link. In another illustrative embodiment, a wireless connection such as radio frequency transmission over free space is used as the broadband link. In yet another illustrative embodiment of the invention, the broadband link comprises high-speed modems attached to each end of a pair of copper wires. In all of the illustrative embodiments, optical fiber is used in the feeder portion of loop plant, but not in the distribution portion of loop plant.

The location of the remote equipment enclosure is selected to best serve the broadband link rather than to make efficient use of the narrowband multiplexing equipment such as AT&T's SLC® 2000 system. For example, in the preferred embodiment of the invention, specially packaged SLC 2000 modules are installed in a 60-type enclosure that was designed for hybrid fiber coax (HFC) rather than SLC equipment. Additionally, SLC 2000 equipment was designed to handle up to 2000 customers, and yet it is installed within an enclosure that is designed and located to serve 200-500 customers. This strategy only becomes cost effective when the SLC equipment is removed (and re-used at another location) and replaced by broadband access (BA) equipment. Advantageously, the same equipment enclosure, or at least the same cement pedestal on which it sits, can be used again without having to purchase rights to another location.

BRIEF DESCRIPTION OF THE DRAWINGS

The present invention, as defined in the claims, can be better understood when reference is made to the following drawings. These drawings are not necessarily to scale, emphasis instead being placed upon clearly illustrating the principles of the present invention.

DETAILED DESCRIPTION

Figure 1:
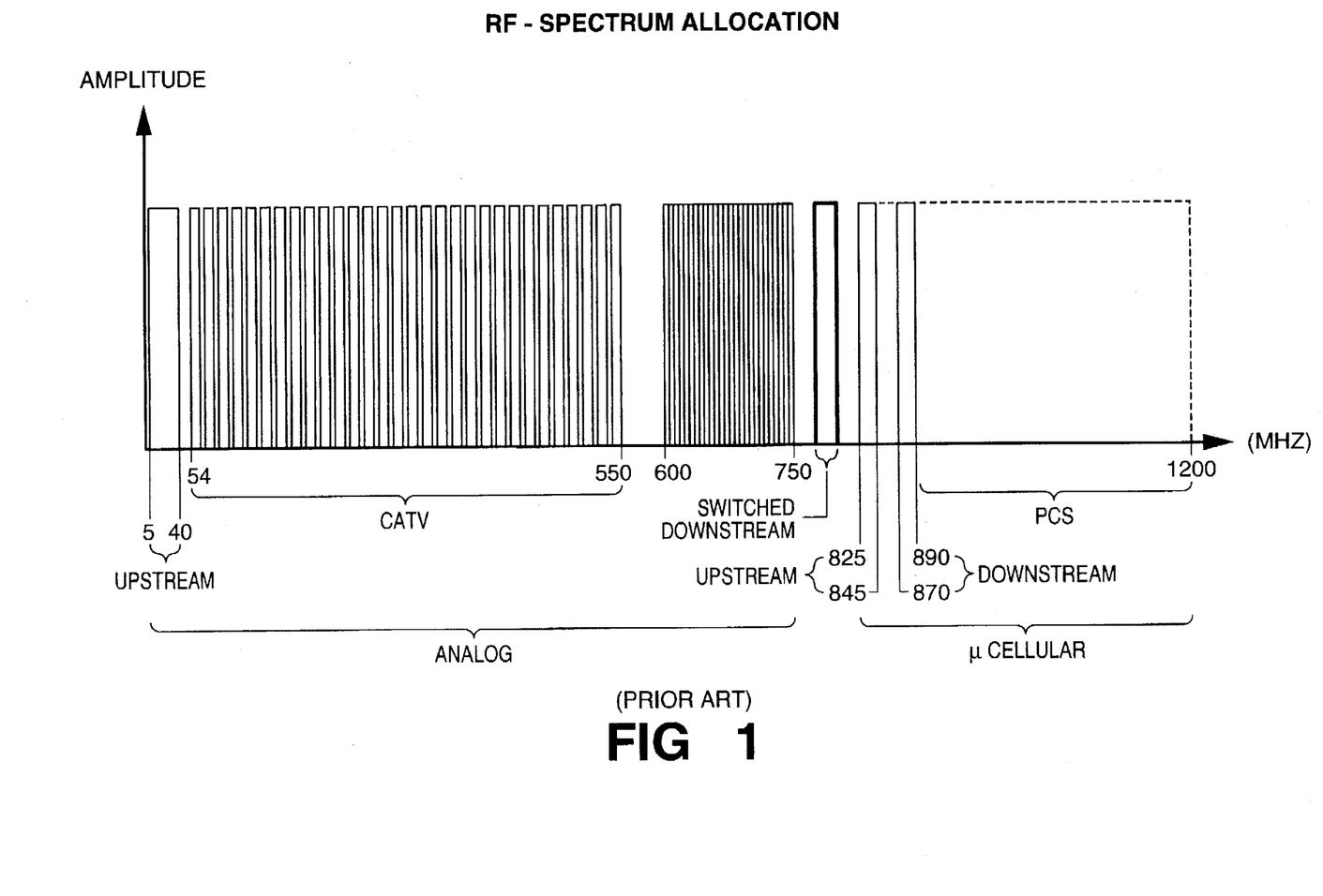
FIG. 1 is a graphical illustration of the radio frequency spectrum allocation set by the Federal Communications Commission.

FIG. 1 graphically illustrates the radio frequency spectrum allocation as dictated by the Federal Communications Commission (FCC). From FIG. 1 we can see that in order for a network to provide switched telecommunication services, CATV, and wireless services (including PCS), the transmission medium would require a broadband capability of approximately 1200 MHz. A transmission medium having the capacity necessary to provide the above services is optical fiber. And while it is speculated that at some point in the future all customers will have optical fiber run into their home or office, it is not economically prudent to deploy an all-fiber network at the present time or in the foreseeable future. Nevertheless, an evolution of fiber access in loop plant has been described in the prior art—reference being specifically made to the AT&T Technical Journal, January/February 1992 at pages 31–45.

"Loop plant" generally refers to cables and apparatus that are located between a telephone switching office and a customer's premises. It is further classified as feeder and distribution plant which are series connected. Existing feeder plant primarily comprises large bundles of copper wires that emerge from the telephone switching office, while existing distribution plant primarily comprises the copper wires that connect to each customer. Over these copper wires, the telephone company is able to supply DC voltage (48 volts) for powering the customer's telephone set, and to transmit a narrowband (e.g., 300–3000 Hz) electrical signals which are suitable for voice communication. No amplifiers are needed, although load coils are frequently used on longer loops to shape the overall frequency response.

Loop plant is costly due to constant additions and rearrangements that result from rapid growth and movement of customers. A portion of the cost of this changing plant has been offset by substituting electronics for cable; and a family of digital loop carrier (DLC) systems has evolved. It is noted that DLC is the generic name associated with any system in which a plurality of narrowband analog channels are digitized and combined into a digital data signal. In 1979 AT&T introduced a DLC system known as SLC-96 which links a remote terminal to a telephone central office terminal via two or four T1 lines. A T1 line comprises two pairs of twisted copper wires—each pair transmitting binary data in one direction at 1.544 Mb/s. The 1.544 Mb/s signal comprises 24 time division multiplexed channels—each having a data rate of 64 kb/s. Accordingly, up to 96 voice channels can be carried over four T1 lines. (It is noted that a digitized voice signal typically requires 64 kb/s, unless compression and/or fewer quantizing levels are used.)

However, the provisioning of SLC 96 carrier systems with T1 lines became difficult when the growth rate of customers on a particular route became too large. The difficulties arose from the congestion of manholes that had to house the repeaters, insufficient wire pairs to support the required number of T1 lines, and interference between T1 lines sharing the same cable. Such problems could have been alleviated by the addition of new cables and/or manholes, but it now becomes economically advantageous to install lightguide cable and utilize each lightguide to support the transmission of several SLC 96 carrier systems. It had long been recognized that the advantages of DLC systems operating on wire pairs could be enhanced by the use of lightguides in place of wire pairs. Lightwave systems provide large bandwidth, small cable size, long-range repeaterless operation, and immunity to electromagnetic interference.

Figure 2:
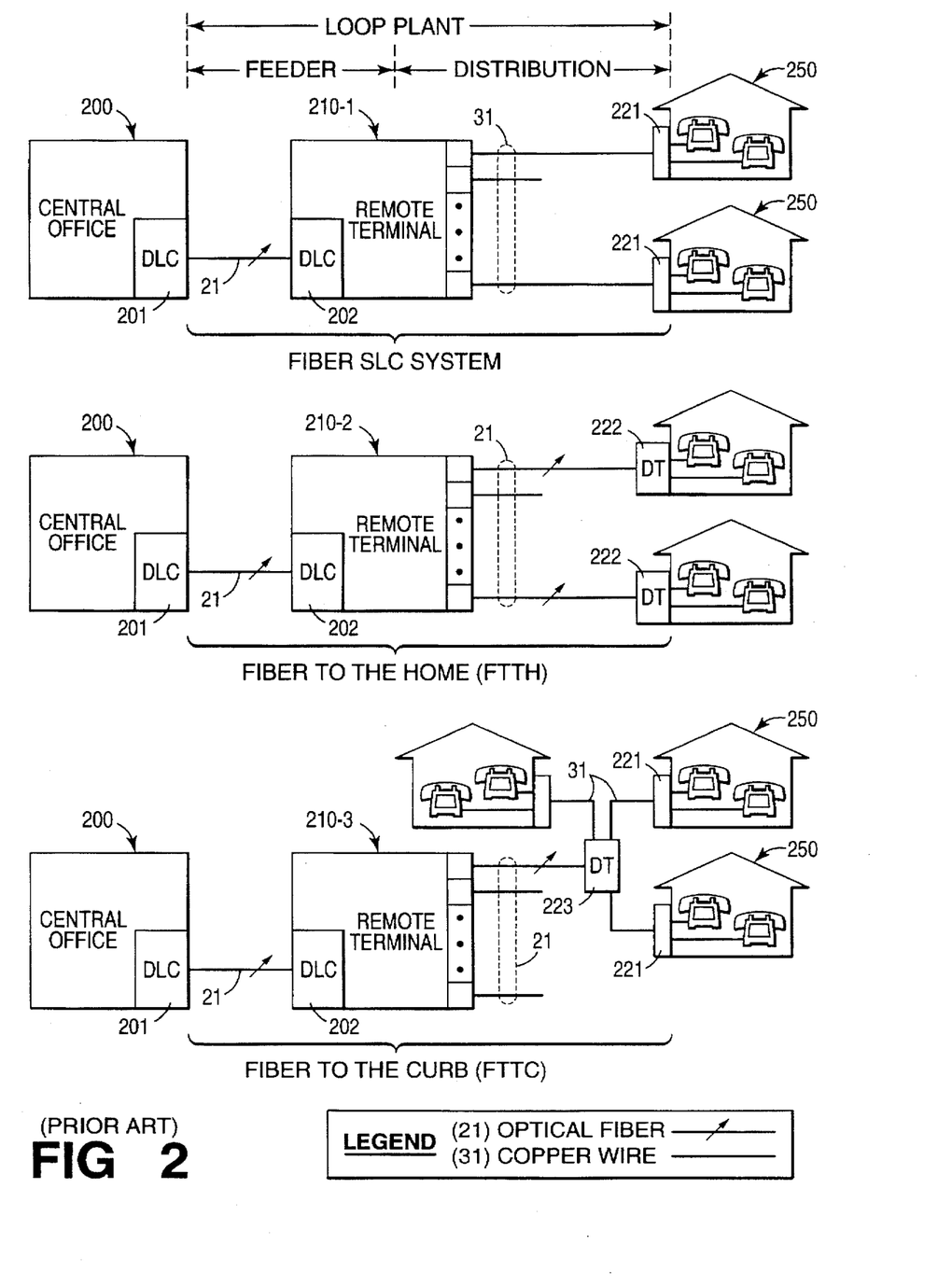
FIG. 2 discloses a prior art evolution of optical fiber access in loop plant.

FIG. 2 discloses the evolution of fiber access in the loop as envisioned in 1992. At that time, AT&T's fiber SLC carrier system had already been in operation for about ten years and optical cable 21 was used in the feeder portion, although copper wires 31 were still used in the distribution portion of loop plant. The operation of this system is described in greater detail in an article entitled "The Fiber SLC Carrier System" which was published in the AT&T Bell Laboratories Technical Journal Vol. 63, No. 10, December 1984 and is hereby incorporated by reference. Briefly, DLC multiplexing and demultiplexing equipment 201,202 is located at the end points of optical cable 21 which extends between central office 200 and remote terminal 210-1. At the remote terminal 210-1, optical signals received from optical cable 21 are converted to electrical signals, demultiplexed, and converted back into a plurality of narrowband analog signals for distribution via copper wire pairs 31 to conventional telephone connecting apparatus 221 at the customer's home 250. The fiber SLC carrier system uses an operating wavelength ($\lambda p$) of 1.3-$\mu$m to transmit at the DS2 rate (6.312 Mb/s) or DS3 rate (44.736 Mb/s) to combine 96 customers or 672 customers respectively. Multimode fiber was used in the fiber SLC carrier system; however, significant improvements in bandwidth and signal loss are now available by operating at wavelengths in the 1.55-$\mu$m region, and using singlemode fiber.

The next stage in the evolution of fiber access in loop plant took place in 1988 when AT&T introduced its SLC Series 5 equipment to provide fiber to the home (FTTH) service. Remote terminal 210-2 houses special channel units and optical cards that allow two or four DS0 rate channels (64 kb/s) to be transmitted over a single fiber to a distant terminal 222 mounted on the side of a customer's home. At the distant terminal 222, the optical signals are converted into electrical signals and demultiplexed. Conventional copper wires are then run from the distant terminal 222 into the home. Each distant terminal 222 has the necessary power conversion equipment, ringing generator, and batteries to provide POTS to customers. However, while the FTTH configuration shown in the center of FIG. 2 is compelling because of its simplicity and maximum fiber penetration, the placement of active electronics and optics on each house cannot be justified economically. Accordingly, the need to reduce the cost of such a system has driven the local exchange carriers (LECs) to relocate the distant terminal to curbside, where common costs can be spread among several customers. This configuration is known as fiber to the curb (FTTC) and is shown at the bottom of FIG. 2. Here, copper wire pairs 31 are run for distances up to 1300 feet from the distant terminal 223 to conventional telephone connecting apparatus 221 at each customer's home 250.

The present invention recognizes a number of factors that, together, suggest that a slightly different evolution in loop plant is possible.

Optical fiber is the preferred transmission medium in the feeder portion of loop plant, and DLC systems are already available for installation.

A majority of households already have coaxial cable running down their street, if not all the way to the house, and coaxial cable is capable of handling the communication and entertainment needs of most non-business customers into the foreseeable future.

Improvements in the delivery of information over copper wires are inevitable, and such improvements may well outpace the need for greater bandwidth to the home. For example, data compression algorithms can reduce a volume of data by more than an order of magnitude by eliminating redundant information.

The introduction of optical fiber into the distribution portion of loop plant represents a substantial capital investment whose return is not likely to be realized in the foreseeable future.

Figure 3:
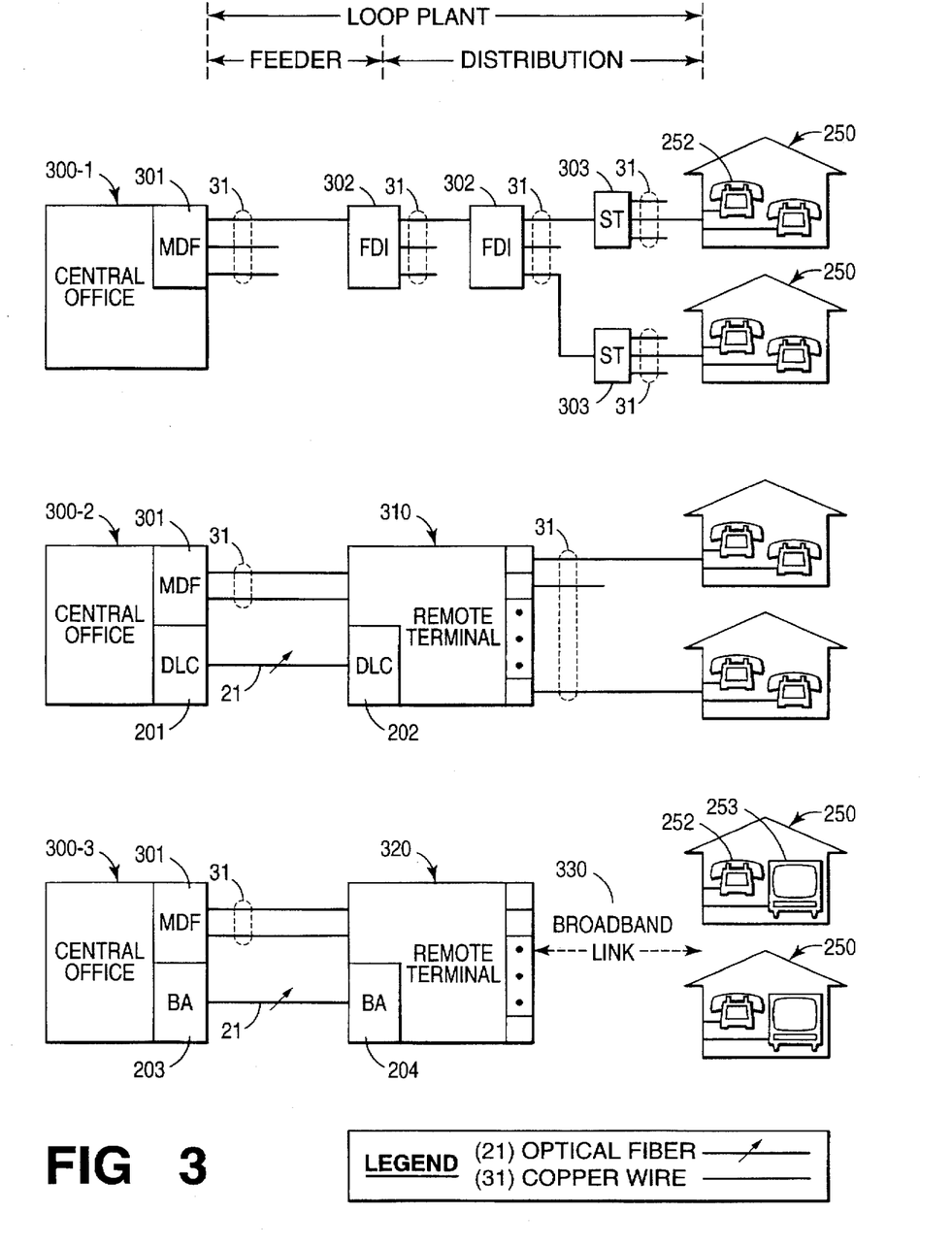
FIG. 3 discloses the evolution of a narrowband telephone network to a broadband telephone network in accordance with the present invention.

With these thoughts in mind, an evolution is contemplated from a narrowband network, comprising copper wire-pairs, into a broadband network utilizing optical fiber in the feeder plant and a non-fiber broadband link in the distribution plant. FIG. 3 discloses various stages in this evolution.

FIG. 3 discloses three selected stages in a method for upgrading a communications network from narrowband to broadband capability in accordance with the present invention. As discussed above, the broadband communications network comprises fiber in the feeder portion of loop plant, but a non-fiber broadband link in the distribution portion of loop plant. The narrowband communications network is shown at the top of FIG. 3 interconnecting a telephone central office 300-1 to terminal equipment 252 at customer locations 250 via conventional loop plant. Loop plant comprises a series of local loop segments extending from within central office 300-1, through various cross-connection elements, to endpoints connected to various customer premises locations. In strictly wire-pair-based arrangements (i.e., twisted pairs of insulated copper wire), these cross-connection elements typically include a main distributing frame 301 within the central office; one or more feeder/distribution interfaces (FDIs) 302, typically housed in grade-level pedestal cabinets, in huts, or in subterranean vaults; and a serving terminal (ST) 303 which is typically housed in an enclosure that is mounted on a utility pole, or on a building, or within a building. The local loop segments extending between a pair of FDIs are called distribution pairs. And the segment extending from the ST 303 to the customer premises 250 is called the drop pair, or drop.

During the first step of the evolution, a location is selected that is suitable for distributing high-frequency signals such as CATV over a non-fiber broadband link to a predetermined number of telephone customers. At this location, an equipment enclosure, hereinafter referred to as remote terminal (RT) 310, is installed. An appropriate location might be at one of the FDIs. Thereafter, optical cable 21 is installed between central office 300-2 and RT 310 for the purpose of delivering new voice services and changes to customer locations 250. At the option of the local telephone company, a portion (e.g. 85%) of the existing copper wire pairs 31 can be "dedicated" to certain customers and never rearranged in the future. Advantageously, this eliminates a principal source of expense in the labor cost associated with need to dispatch a craftsperson into the field to manually make cross-connections in the FDIs and STs. A major portion of this expense arises out of the fact that every new line or maintenance change in loop plant requires, on average, three rearrangements; and that for every three changes, an error is made—either in the rearrangement itself or in one or more administrative database entries that need to be made as a result of the changes—engendering yet additional expense in order to correct the errors. DLC equipment 201,202 is connected to each end of the optical cable 21 that converts a plurality of narrowband (i.e., 300–3000 Hz) analog signals to digital format, multiplexes the digital signals into a serial data bit stream, and transmits them over the optical cable. Suitable DLC equipment comprises SLC 2000 carrier system modules that have been packaged to fit into a 60-type enclosure—these products being commercially available from AT&T. Such packaging can be accomplished by electrical engineers having ordinary skill in the design of such equipment.

During the second step of the evolution shown at the bottom of FIG. 3, the SLC 2000 modules 201 at central office 300-3 and RT 320 is removed and replaced by broadband access (BA) equipment 203, which is capable of handling broadband signals such as CATV and narrowband signals such as voice. Advantageously, the SLC 2000 modules can be re-used at another location.

Broadband link 330 is capable of providing both narrowband service (e.g., to telephone 252) and broadband service (e.g., to television 253). In the preferred embodiment of the invention, the broadband link comprises coaxial cable; although other non-fiber broadband links are possible as discussed below. An example of apparatus that is suitable for replacing the SLC 2000 modules is AT&T's HFC-2000™ Broadband Access System which is a hybrid fiber coax system wherein optical cable is used in the feeder portion of loop plant and coaxial cable is used in the distribution portion.

Remote Terminal

Optical cable 21 terminates at an equipment enclosure which is interchangeably referred to as remote terminal (RT) 310, and which is preferably located to serve about 200–500 customers. This is a large enough customer base to effectively share the costs associated with optical/electrical conversion, multiplexing, and power; yet small enough to minimize the problems of distributing electrical signals to customers. Moreover, it is desirable to eliminate all active electrical devices (e.g., amplifiers) in the loop plant since power loss and electrical surges can disrupt service for substantial time periods, and often require the dispatch of a maintenance crew. It is also desirable to avoid the need for customer-provided electrical power in the delivery of communication services. RT 310 houses optical equipment, electrically-powered apparatus, and power equipment in a cabinet such as the 60D Power/Video Node cabinet, which is commercially available from AT&T. The optical equipment functions to convert information from an optical format to an electrical one in the downstream direction (i.e., toward the customer), and performs the opposite translation in the upstream direction. Electrically-powered apparatus includes amplifiers, lasers, multiplexers and demultiplexers. Power equipment includes backup batteries, apparatus that converts AC power, received from the local public utility or a local generator (fueled by natural gas or propane), to DC power for charging the backup batteries and powering all electronic apparatus between RT 310 and customer premises 250.

The optimum location of the SLC 2000 carrier system has been discussed above and found to be in the range of 500–2000 customers based on cost and reliability criteria.

The contemplated upgrade, however, goes beyond the SLC 2000 system and seeks a more optimum design for a broadband link which does not include optical fiber. What this leads to, however, is the construction of a system that is deliberately designed to be sub-optimum owing to the expectation that it will evolve to include a non-fiber broadband link. Examples of suitable broadband links for use between the equipment enclosure and the customer include coaxial cable, wireless transmission over the air, and copper wire pairs equipped with high-speed modems at each end. Each of these broadband links is a cost-effective alternative to optical fiber since they avoid the need for optical/electrical and electrical/optical conversion circuitry at each customer location 250. Moreover, because the optimum broadband link may change with time as new technologies emerge, the remote terminal should be located, in the first instance, to efficiently accommodate any of the above-mentioned broadband links.

BROADBAND LINKS

Coaxial Cable

The ultimate state of the contemplated broadband communications network preferably comprises coaxial cable in the broadband link and thus is an HFC network. In the illustrative embodiment of the invention shown in FIG. 4, AT&T's HFC-2000 Broadband Access System is shown. At central office 300-3, BA equipment 203 receives broadband signals from various sources, converts them to optical signals, and transmits them to RT 320 over optical cable 21. These are downstream signals. RT 320 converts these downstream signals to electrical radio frequency (RF) signals and places them onto the four coaxial cables 34 for reception by the customers. Each coaxial cable 34 handles 120 customers and carries DC power for amplifiers 35 in the broadband link 330-1. A coaxial cable run may include one or more amplifiers 35, splitters 36, and taps 37 before reaching customer premises 250. At customer premises 250, interface control box 241 is used to pass video and other broadband service signals from the coaxial cable 34 to the premises (e.g., to television 253), and to pass control signals from the premises to the coaxial cable. Although not shown in FIG. 4, copper wires between RT 320 and customer premises 250 may continue to serve telephone set 252.

Figure 4:
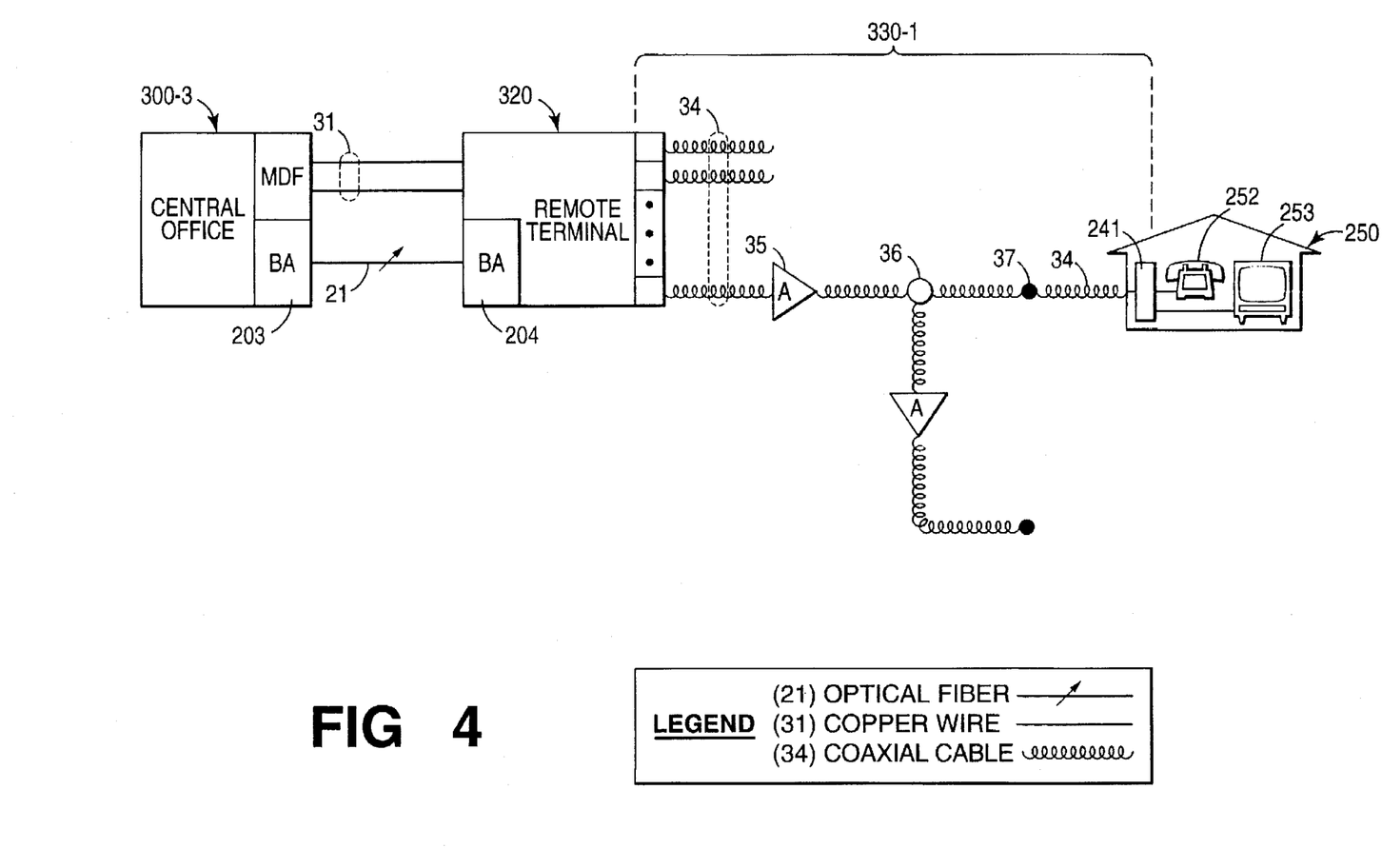
FIG. 4 discloses one embodiment of a broadband link in which coaxial cable is used to transmit voice and high-speed video services to a customer.

Upstream RF signals can originate at the customer location 250 or at active components of the distribution system. BA 204 converts these signals and others originating at RT 320 to lightwave signals and transmits them to BA 203 at the central office 300-3 via optical cable 21.

A general discussion of hybrid fiber coax networks was presented at Session 9 of the 10th Annual National Fiber Optic Engineers Conference, Jun. 12–16, 1994 San Diego, Calif.; published in Vol. 2, of the Proceedings at pages 289–340, which is hereby incorporated by reference.

Wireless

Figure 5:
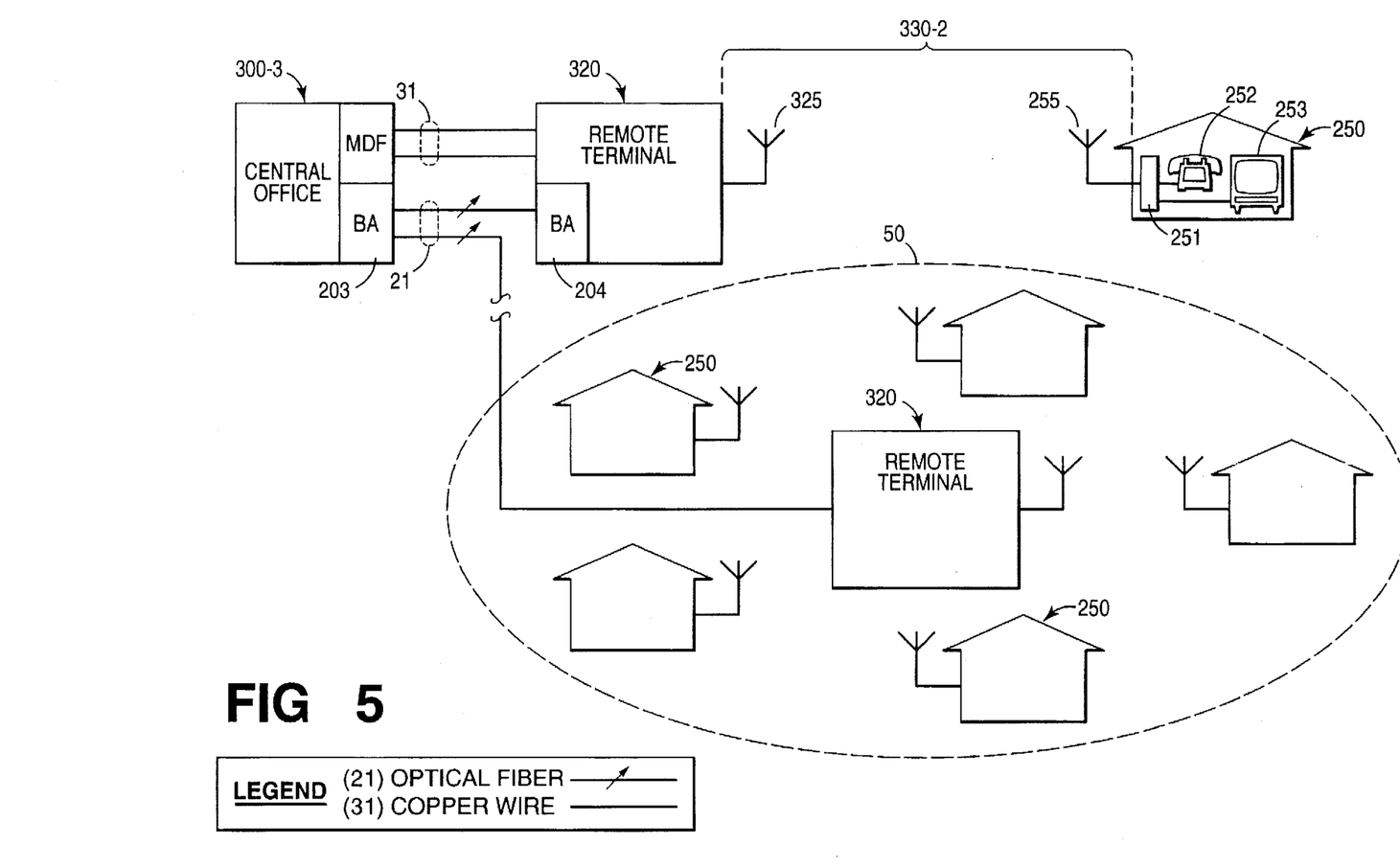
FIG. 5 discloses another embodiment of the broadband link in which wireless communications are used to transmit video services to a customer over a free space media.

Another contemplated broadband link 330-2 is shown in FIG. 5 wherein wireless services are provided to customer premises 250 within microcells 50 which surround different RT locations 320-2. In this embodiment, the remote terminal locations are selected to optimize the wireless coverage of a serving area. Generally, microcells are laid out to blanket the particular serving area with predetermined overlap. Assuming that low capital cost and interference-free performance is desired, a number of factors need to be considered when selecting locations for the various RT 320 locations including the available frequencies, the allowable interference between microcells, and the allowable transmission power levels. As shown in FIG. 5, optical cable 21 and copper wire-pairs 31 interconnect central office 300-3 with remote terminal 320. BA equipment 203 at the central office 300-3 carries, at least, video communication services to BA equipment 204 at the remote terminal 320. This equipment is substantially the same as was disclosed in connection with FIG. 4. However, RT 320 now includes apparatus for broadcasting video communication services to each subscriber. Although not required in the practice of the invention, antenna 325 at each RT 320 has an omnidirectional pattern so that circular microcells 50 are made. At customer premises 250, antenna 255 has a directional pattern, which is aimed at antenna 325 (at its associated RT 320) in order to minimize interference from adjacent microcells, to more efficiently transmit upstream control signals, and to more efficiently receive downstream signals.

At customer premises 250, interface control box 251 is used to pass video and other broadband service signals from the antenna 255 to the premises (e.g., to television 253), and to pass control signals from the premises to the antenna. Although not shown in FIG. 5, copper wires between RT 320 and customer premises 250 may continue to serve telephone set 252.

Carrierless Amplitude and Phase Modulation

Figure 6:
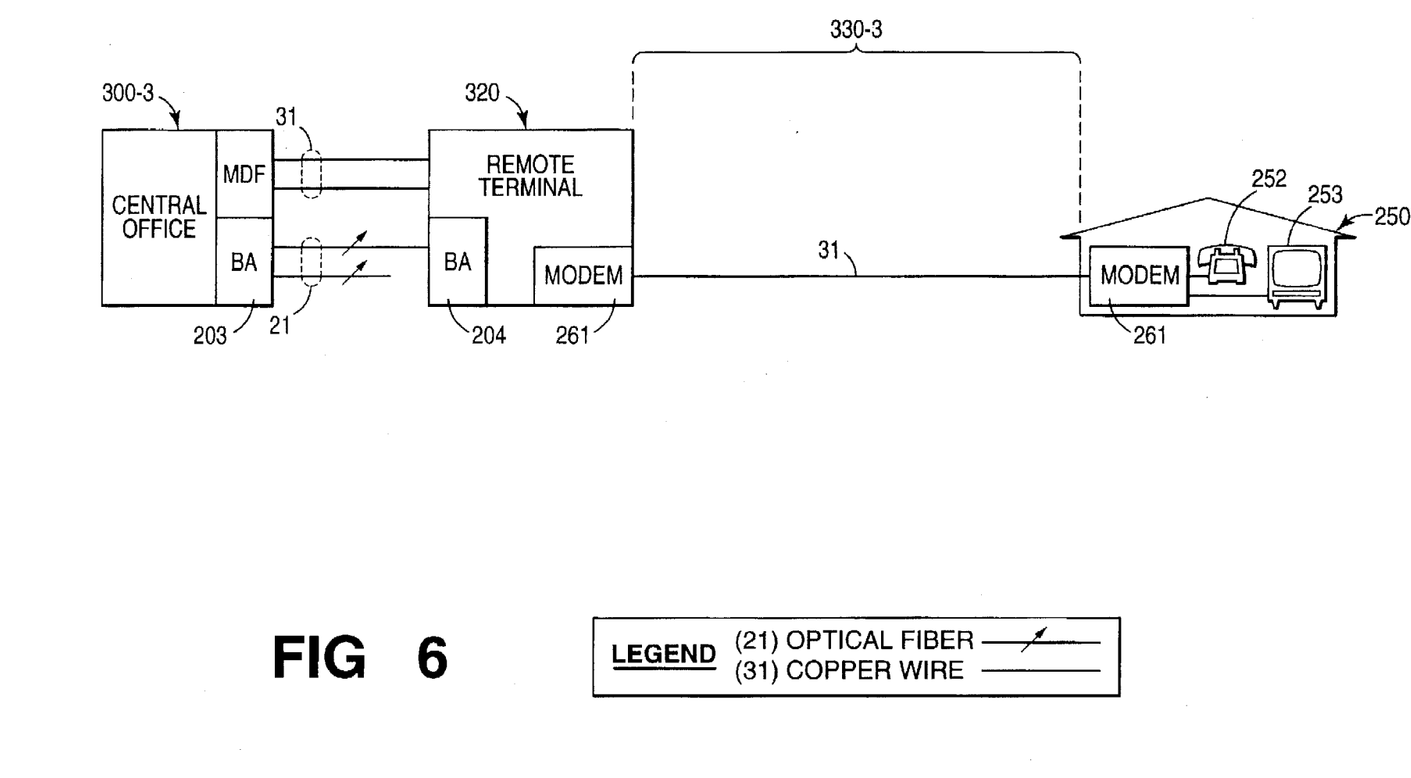
FIG. 6 discloses yet another embodiment of the broadband link in which copper wire pairs are used to transmit voice and high-speed video services to a customer.

Yet another contemplated broadband link 330-3 is shown in FIG. 6 wherein high-speed data transmission carries video communication service over twisted copper wire-pairs 31. Modems 261 (modulator/demodulator) using a carrierless amplitude and phase (CAP) modulation algorithm are used to transmit signals at speeds up to 6.3 Mb/s, compared to 28.8 kb/s of regular modems. With it, copper wire can carry broadband video, data, and voice services at speeds that previously required optical fiber or coaxial cable. Voice signals are transmitted without modulation and occupy the frequency band from 300–3000 Hz. CAP technology uses the frequencies above that for data. A passive filter prevents data from interfering with the voice signals so that power is not needed to separate the two. Accordingly, if there is a power failure, voice service is retained. At 6.3 Mb/s, service can be provided over a distance of 12 kilofeet. Higher speeds are achievable at shorter distances. It is noted that acceptable quality television signals can be transmitted digitally at 6.3 Mb/s with known video compression algorithms. Devices using the CAP modulation algorithm are available from AT&T and are referred to as its GlobeSpan™ transmission technology; and an overview of CAP can be found in *IEEE MultiMedia*, Local Distribution for IMTV, Fall 1995, pp. 14–23.

CAP is a bandwidth-efficient two-dimensional passband transmission scheme, which is closely related to the more familiar quadrature amplitude modulation transmission scheme. Briefly, a bit stream to be transmitted is first scrambled and then fed to an encoder which maps blocks of m bits into one of $k=2^m$ different complex symbols $A_n=a_n+jb_n$. The two-dimensional display of the discrete values assumed by the symbols $a_n$ and $b_n$ are fed into digital shaping filters. The outputs of the filters are subtracted and the result is passed through a digital-to-analog (D/A) converter, which is followed by an interpolating low-pass filter. The digital shaping filters and the D/A operate at a sampling rate $1/T'=i/T$, where i is a suitably chosen integer and $1/T$ is the symbol rate.

At customer premises 250, modem 261 is used to pass video and other broadband service signals from the copper wire-pairs to the premises (e.g., to television 253), and to pass control signals from the premises to the copper wire-pairs. A simple low-pass filter, which may be incorporated into the design of modem 261, is used to separate audio communication from video communication. The structure of a digital CAP receiver consists of an analog-to-digital (A/D) converter followed by a parallel arrangement of two adaptive digital filters. The A/D and the digital filters operate at the sampling rate 1/T'=i/T, which is typically the same as the sampling rate used at the transmitter. The parallel arrangement of adaptive filters is called a T/i fractionally spaced linear equalizer (FSLE). The two outputs of the FSLE are sampled at the symbol rate 1/T and the results are fed to a decision device followed by a decoder, which maps the symbols into bits.

More complete detail on the design of CAP transmitters and receivers can be found in AT&T/Bellcore contribution T1E 1.4/92-149, *Design of digital carrierless AM/PM transceivers*, Aug. 19, 1992, which is hereby incorporated by reference.

It will be obvious to those skilled in the art that many modifications and variations may be made to the present invention as described above. The disclosure and description are intended to illustrative and not in any sense limiting to the present invention, which is more particularly defined in scope by the following claims.

We claim:

1. A method for upgrading a narrowband communications network to a broadband communications network; said narrowband network comprising metallic wire pairs that conduct analog voice signals between a telephone office and a plurality of telephone customers, said broadband network comprising optical fibers that extend between the telephone office and a remote terminal, and a broadband link—other than optical fibers—that extends between the remote terminal and the telephone customers; the method including the steps of:

selecting a location that is suitable for distributing video signals such as CATV over the broadband link to a predetermined number of the telephone customers;

installing a remote terminal at the selected location;

installing an optical cable between the telephone office and the remote terminal, said optical cable comprising a plurality of optical fibers;

installing digital loop carrier (DLC) equipment at the telephone office and at the remote terminal, said DLC equipment including multiplexers for combining a number of voice signals and digitally transmitting same over a lesser number of optical fibers;

removing the DLC equipment at the telephone office and at the remote terminal, and replacing same with broadband access equipment for transmitting voice and video signals; and installing the broadband link between the remote terminal and one or more of the telephone customers for transmitting said video signals.

2. The method of claim 1 wherein the predetermined number of telephone customers is less than five hundred.

3. The method of claim 2 wherein the predetermined number of telephone customers is more than two hundred.

4. The method of claim 1 wherein the broadband link comprises coaxial cable.

5. The method of claim 1 wherein the broadband link comprises wireless transmission over the air.

6. The method of claim 1 wherein the broadband link comprises high-speed modulation and demodulation apparatus at the telephone customer location and the selected remote terminal location—transmitting over a pair of copper wires.

7. The method of claim 6 wherein carrierless amplitude and phase modulation is used.

8. A method for upgrading a voice communications network to a hybrid fiber coax (HFC) network; said voice network comprising metallic wire pairs that conduct analog voice signals between a telephone office and a plurality of telephone customers, said HFC network comprising optical fibers that extend between the telephone office and a remote terminal, and coaxial cable that extends between the remote terminal and the telephone customers; the method including the steps of:

selecting a location that is suitable for distributing video signals over coaxial cable to a predetermined number of telephone customers;

installing a remote terminal at the selected location;

installing an optical cable between the telephone office and the remote terminal, said optical cable comprising a plurality of optical fibers;

installing digital loop carrier (DLC) equipment at the telephone office and at the remote terminal, said DLC equipment including multiplexers for combining a number of voice signals and digitally transmitting same over a lesser number of the optical fibers;

removing the DLC equipment at the telephone office and at the remote terminal, and replacing same with broadband access equipment for transmitting voice and video signals; and installing coaxial cable between the remote terminal and one or more of the telephone customers for transmitting said video signals.

* * * * *